United States Patent

Serenko et al.

[11] Patent Number: 6,042,725
[45] Date of Patent: Mar. 28, 2000

[54] WATER FILTER CARTRIDGE

[75] Inventors: Paul Serenko, Allenford; Roy Matsushita, Sunderland, both of Canada

[73] Assignee: Matscorp Ltd., Markham, Canada

[21] Appl. No.: 09/062,608

[22] Filed: Apr. 20, 1998

[51] Int. Cl.[7] .................................................. B01D 27/02
[52] U.S. Cl. ........................................... 210/266; 210/282
[58] Field of Search ..................................... 210/266, 282, 210/289, 541

[56] References Cited

U.S. PATENT DOCUMENTS

| | | | |
|---|---|---|---|
| 3,957,931 | 5/1976 | Ellis et al. | 210/150 |
| 4,041,113 | 8/1977 | McKeown | 210/150 |
| 4,793,922 | 12/1988 | Morton | 210/317 |
| 4,895,648 | 1/1990 | Hankammer | 210/188 |
| 5,536,394 | 7/1966 | Lund et al. | 210/475 |
| 5,811,004 | 9/1998 | Robertson et al. | 210/482 |
| 5,882,507 | 3/1999 | Tanner et al. | 210/94 |

*Primary Examiner*—Ivars Cintins
*Attorney, Agent, or Firm*—Patrick J. Hofbauer

[57] ABSTRACT

An improvement in a water filter cartridge of the type having a substantially frustoconical vessel member defining a vertical axis and containing a granular purifying agent which is insoluble in water. The vessel member has a screen-like end wall portion at the lower end thereof. A hollow substantially frustoconical cover member is attached to the vessel member and coaxial with the vertical axis thereof. The cover member defines an annular rim portion and a first slanted portion extending upwardly and inwardly from the rim portion, and a substantially flat-topped second portion, the first portion having a multiplicity of vertically oriented water entry flow slots arrayed therearound. The vessel member and the cover member together define a container for receiving and retaining said granular purifying agent therein. A first layer of filtration material is disposed within said vessel member and layered upon said granular purifying agent. The water filter cartridge is for use in a water filtration device. The improvement comprises the provision of a water flow directing ring positioned above the granular purifying agent and above the first layer of filtration material. The water flow directing ring has a substantially peripherally disposed main body portion shaped and dimensioned to contact the container at its interior surface at a level above the granular purifying agent and below the water entry flow slots. At least one drip arm extends radially inwardly from the main body portion in overlying relation to the granular purifying agent and the first layer of filtration material.

16 Claims, 4 Drawing Sheets

WATER FILTER CARTRIDGE

FIELD OF THE INVENTION

The present invention relates to improvements in water filter cartridges to be used in a hand-held water filtration device, the filter cartridges being adapted to permit water flow therethrough, and containing a granular purifying agent which is insoluble in water, and more particularly relates to a water flow directing ring that directs the flow of water to be filtered within the water filter cartridge for more efficient use of the granular purifying agent.

BACKGROUND OF THE INVENTION

Various hand-held devices are known which utilize a granular purifying agent which is insoluble in water, such as activated charcoal and/or an ion exchange material for the purification of water. Examples of such devices are: U.S. Pat. No. 4,306,971 (Hankammer); U.S. Pat. No. 4,895,648 (Hankammer); U.S. Pat. No. 4,969,996 (Hankammer); U.S. Pat. No. 5,049,272 (Nieweg): and, PCT published Application No. WO 96/31440 (Serenko et al.).

Generally, these devices comprise a large funnel-shaped member to hold and channel the water to be purified, a removable filtration cartridge placed in the flow channel of the funnel-shaped member, and a collection beaker for the purified water. The filtration cartridges are typically constructed from inexpensive plastics materials and comprise a substantially frustoconical hollow vessel member capped by a hollow cover member, which vessel member and cover member together define a container for receiving and retaining the granular purifying agent therein. The cover member includes an annular inlet portion extending upwardly and inwardly from a peripheral rim portion, and topped by a substantially flat-topped central portion. The annular inlet portion has a multiplicity of vertically oriented water entry flow slots arrayed therearound to permit water to enter into the hollow vessel member whereat the water comes in contact with the granular purifying agent which is typically an ion exchange material. A screen-like end wall portion is typically disposed at the lower end of the hollow frustoconical vessel member below the granular purifying agent to permit the filtered water to pour into the collection beaker.

All known granular purifying agents have a maximum cumulative filtering capacity, or in other words lose their effectiveness after filtering a predictable amount of water, typically after about a month of normal household usage (i.e., after about 100 litres of water have been filtered). Accordingly, such filtration cartridges are designed to be discarded after a rather short period of time. In order to maximize the volume of water that a predetermined amount of granular purifying agent can effectively treat, thereby lengthening the time that a filtration cartridge can be used, it is necessary to effectively and fully use the entire mass of the granular purifying agent during filtration.

Further, the rate of flow of water through the filter cartridge is critical for effective water purification. It is necessary to contain the water within the filtration cartridge for a sufficient time to allow for effective ion exchange and filtration to occur, yet if the flow rate of water through the cartridge is too slow, then an insufficient volume of water will be purified, in a time frame which is satisfactory to the user of the filtration system. In order to minimize the length of time of filtration, yet still achieve full and proper filtration, it is necessary maximize the amount of filtering per unit time. To accomplish this, it is necessary to use the entire volume of the active granular purifying agent within the filter.

It has been found, however, with all types of prior art hand-held water filtration devices, that water tends to adhere to the inner surface of the hollow cover member after it flows through the water entry flow slots therein, in the sense that it tends to flow down the inside surface of the hollow cover member as the water makes its way toward the granular purifying agent. As such, much of the water therefore contacts the granular purifying agent in the peripherally disposed region adjacent the interior wall surface of the vessel member holding the granular purifying agent. Accordingly, a significant radially inner portion of the granular purifying agent receives substantially less water volume than the peripherally disposed region adjacent the inner wall surface of the hollow vessel member, thus very significantly underutilizing the capacity of the whole mass of granular purifying agent. As a result of this phenomenon, it has been found that, with conventional hand-held water filtration devices of the type described above, that a significant portion of the granular purifying agent towards the centre of the water filter cartridge remains chemically active within acceptable ranges, while the chemical activity of the outer peripheral ring of granular purifying agent adjacent to the inner wall of the hollow vessel member has deteriorated to the point that the water filter cartridge must be discarded. Moreover, it has also been found that settling of the granular purifying agent occurs unevenly toward the centre of the filter cartridge, so as to cause more dense packing of the granular purifying agent toward the centre of the cartridge. This causes a zone of least resistance to water flow adjacent to the inner wall of the hollow vessel member, with the result that the water being filtered tends to remain near the peripherally disposed interior surface of the hollow vessel member as it passes through the granular purifying agent from top to bottom. Moreover, uneven wetting of the granular purifying agent levels to cause the formation of air pockets within the granular purifying agent, which can of course, impede water flow rates through the filter cartridge.

It is therefore an object of the present invention to provide an improved water filter cartridge which overcomes these and other problems associated with prior art water filter cartridges.

It is another object of the present invention to provide an improved water filter cartridge that maximizes the volume of water that a predetermined amount of granular purifying agent can effectively filter before being discarded.

It is a further object of the present invention to provide an improved water filter cartridge that can be used for a longer period of time than prior art filter cartridges before expiry of the same mass of granular purifying agent.

It is yet another object of the present invention to provide an improved water filter cartridge that uses substantially the entire mass of the granular purifying agent during filtration.

It is yet a further object of the present invention to provide an improved water filter cartridge wherein the flow rate of water through the filtration cartridge permits a sufficient volume of water to be purified in a time frame which is satisfactory to the user, yet still achieves full and proper filtration and resists the formation of trapped air within the granular purifying agent.

It is yet another object of the present invention to provide an improved water filter cartridge that maximizes the amount of filtering of water per unit time.

SUMMARY OF THE INVENTION

In accordance with one aspect of the present invention, there is disclosed an improvement in a water filter cartridge of the type having a substantially frustoconical vessel member defining a vertical axis and containing a granular purifying agent which is insoluble in water, the vessel member having a screen-like end wall portion at a lower end thereof, a hollow substantially frustoconical cover member attached to the vessel member and coaxial with the vertical axis thereof, the cover member defining an annular rim portion and a first slanted portion extending upwardly and inwardly from the rim portion, and a substantially flat-topped second portion, the first portion having a multiplicity of vertically oriented water entry flow slots arrayed therearound, the vessel member and the cover member together defining a container for receiving and retaining the granular purifying agent therein, the water filter cartridge for use in a water filtration device. The improvement comprises a first layer of filtration material disposed within said vessel member and layered upon said granular purifying agent and the provision of a water flow directing ring positioned within the container above the granular purifying agent and above the first layer of filtration material. The water flow directing ring has a substantially peripherally disposed main body portion shaped and dimensioned to contact the container at its interior surface above the granular purifying agent and above the first layer of filtration material and below the water entry flow slots. At least one drip arm extends radially inwardly from the main body portion in overlying relation to the granular purifying agent and to the first layer of filtration material.

In accordance with another aspect of the present invention, there is disclosed a water flow directing ring for use in a water filter cartridge of the type having a substantially frustoconical vessel member defining a vertical axis and containing a granular purifying agent which is insoluble in water, the vessel member having a screen-like end wall portion at a lower end thereof, a hollow substantially frustoconical cover member attached to the vessel member and coaxial with the vertical axis thereof, with the cover member defining an annular rim portion and a first slanted portion extending upwardly and inwardly from the rim portion, and a substantially flat-topped second portion. The first portion has a multiplicity of vertically oriented water entry flow slots arrayed therearound, with the vessel member and the cover member together defining a container for receiving and retaining the granular purifying agent therein. The water filter cartridge thus formed is ideally suited for use in a water filtration device. The water flow directing ring comprises a substantially peripherally disposed main body portion positionable within the container to contact the container at its interior surface above the granular purifying agent and below the water entry flow slots. At least one drip arm extends radially inwardly from the main body portion in overlying relation to the granular purifying agent.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel features which are believed to be characteristic of the improved water filter cartridge according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION OF A PREFERRED EMBODIMENT

Figure 1:
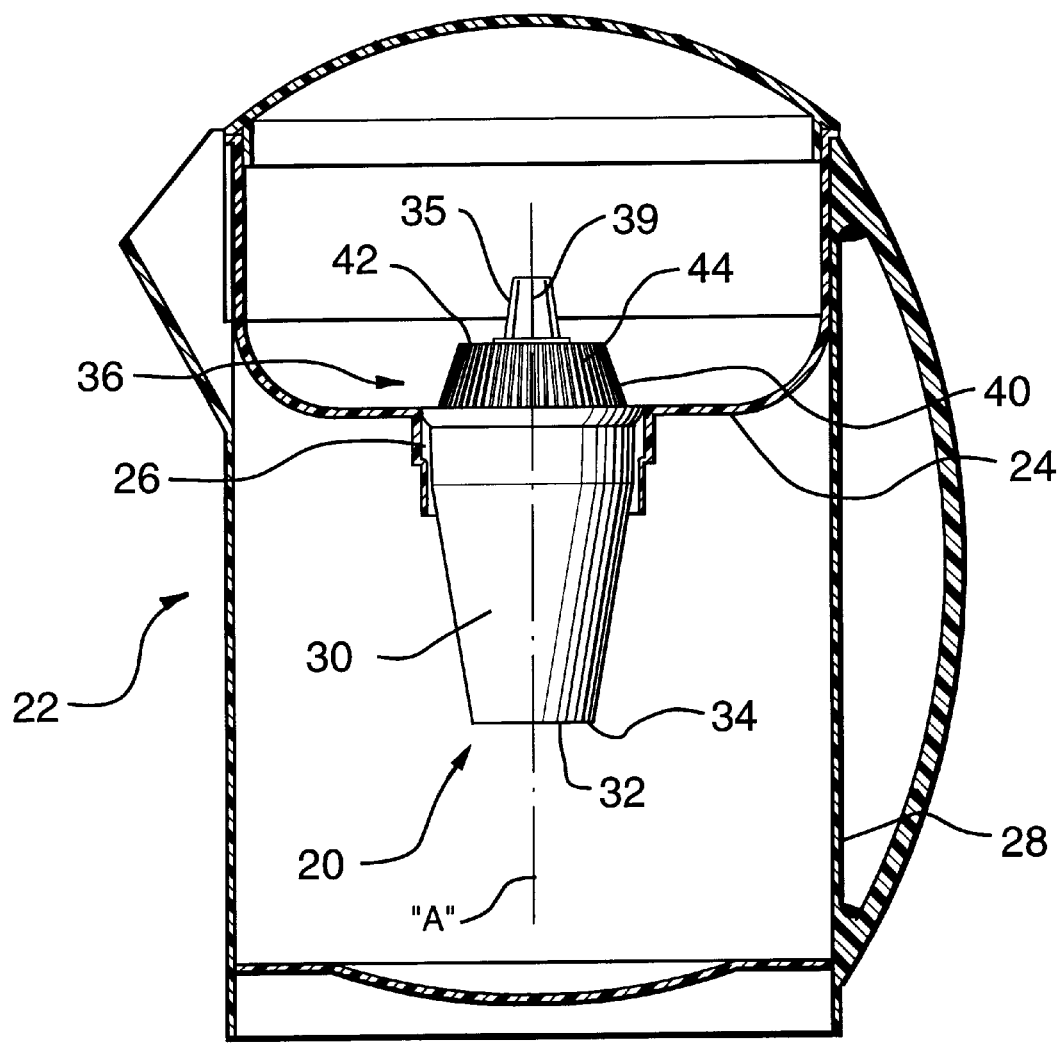
FIG. 1 of the drawings appended hereto is a perspective view of a preferred embodiment of improved water filtration cartridge according to the present invention in place in a hand-held water filtration system, which system is shown in section.

Reference will now be made to FIGS. 1 through 5 of the drawings, which figures show a preferred embodiment of improved water filter cartridge according to the present invention, as indicated by the general reference numeral 20. The water filter cartridge 20 as described and illustrated is for use in a water filtration device, as indicated by the general reference numeral 22, and as best seen in FIG. 1. The water filtration device 22 comprises a large generally funnel-shaped member 24 adapted to hold and channel the water to be filtered. The funnel-shaped member 24 contains a flow channel 26, which channel 26 is sized to support the water filter cartridge 20. Filtration of the water occurs within the water filter cartridge 20, and the filtered water is collected and held in a collection beaker 28.

Figure 2:
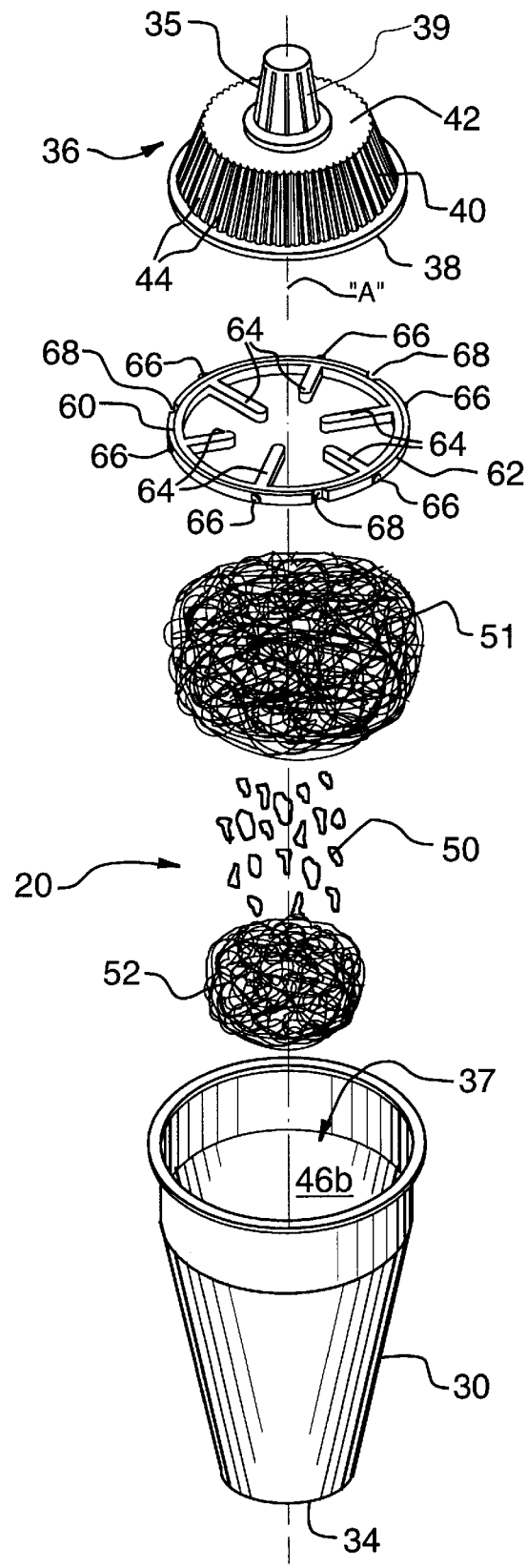
FIG. 2 of the drawings is an exploded perspective view of the water filtration cartridge of FIG. 1.
Figure 3:
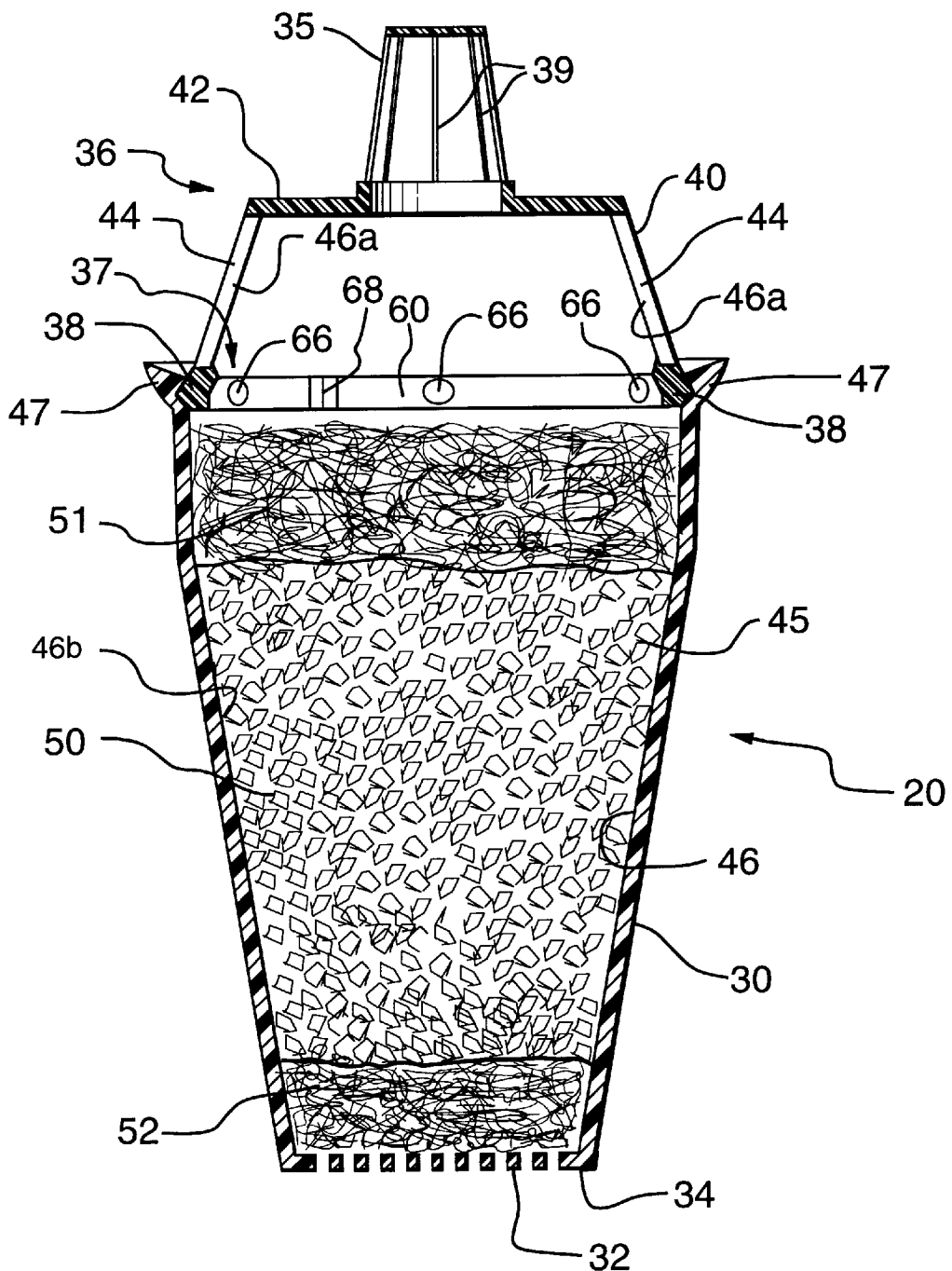
FIG. 3 of the drawings is a vertical mid-line section of the water filtration cartridge of FIG. 1.
Figure 4:
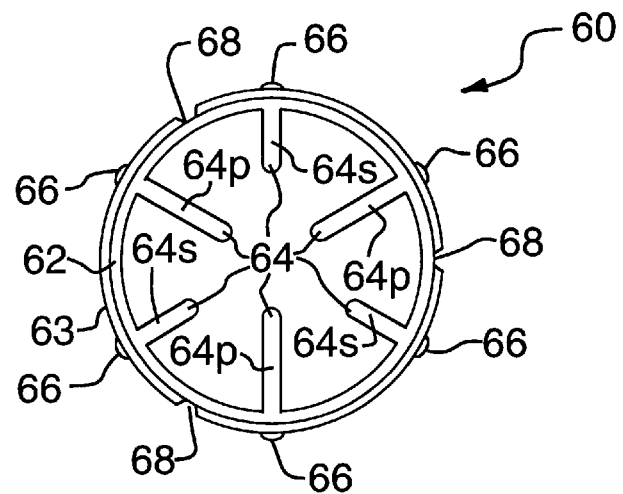
FIG. 4 is a top plan view of a key component of the invention also visible in FIG. 2.
Figure 5:
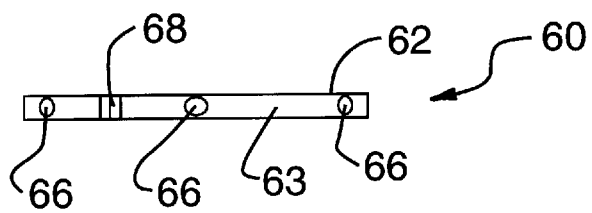
FIG. 5 is a side elevational view of the component shown in FIG. 4.

As can be best seen in FIGS. 2 and 3, the water filter cartridge 20 is one of the type having a substantially frustoconical vessel member 30 defining a substantially vertical axis "A" and containing any well known granular purifying agent 50, which is insoluble in water. The vessel member 30 has a screen-like end wall portion 32 (see FIG. 3)at a lower end 34 thereof, which screen-like end wall portion 32 permits water to flow out of the vessel member 30 and into the collection beaker 28. A hollow substantially frustoconical cover member, as indicated by the general reference numeral 36, is attached to the upper open end 37 of the vessel member 30, defined by annular shoulder portion 47 so as to be coaxial with the vertical axis "A" thereof. The cover member 36 defines an annular rim portion 38, as can be best seen in FIGS. 2 and 3, and a first slanted portion 40 extending upwardly and inwardly from the rim portion 38. A substantially flat-topped second portion 42 tops the cover member 36, which second portion 42 preferably includes a generally centrally disposed chimney portion 35 having ventilation slots 39 therein. The first slanted portion 40 has a multiplicity of substantially vertically oriented water entry flow slots 44 arrayed therearound to permit water to enter into the interior 45 of the water filter cartridge 20.

The vessel member 30 and the cover member 36 together define a container, which container is for receiving and retaining the granular purifying agent 50 therein.

Preferably, the water filter cartridge 20 further comprises a first layer of filtration material 51 disposed within the container 31, preferably within the vessel member 30, and layered upon the granular purifying agent 50. The first layer of filtration material 51 may be substantially supported by the granular purifying agent 50 or may be substantially supported by the vessel member 30, or by a combination of both.

The water filter cartridge 20 further preferably comprises a second layer of filtration material 52 disposed within the vessel member 30 in juxtaposed relation to the end wall portion 32. The granular purifying agent 50 is layered upon and is supported by the second layer of filtration material 52.

The first layer of filtration material 51 and the second layer of filtration material 52 are entirely optional, but have been included in the preferred embodiment of the present invention, as illustrated, as they improve its overall filtering function, especially with respect to particulate matter. The first 51 and second 52 layers of filtration material are each preferably constructed from a multiplicity of fine flexible fibres of a substance which is insoluble in water, such as spun polyester, as taught in published PCT Application No. WO 96/31440 (Serenko), but may optionally be constructed from a more planar pad of cotton felt or the like, such as is known in the art.

The improvement in the water filter cartridge 20 according to the present invention comprises the use of a water flow directing ring 60 positioned within the container above the granular purifying agent 50. In the preferred embodiment illustrated, it is substantially annular and is positioned above the first layer of filtration material 51. The water flow directing ring 60 has a substantially peripherally disposed main body portion 62 which is shaped and dimensioned to contact the container at its interior surface 46, above the top level of the granular purifying agent 50 and below the water entry flow slots 44. In the preferred embodiment illustrated, and as can be best seen in FIG. 3, the main body portion 62 of the water flow directing ring 60 contacts the interior surface 46a of the cover member 36. In an alternative embodiment (not shown), 4it is contemplated that the main body portion 62 of the water flow directing ring 60 could contact the interior surface 46b of the substantially frustoconical vessel member 30. In either embodiment, the container supports the water flow directing ring 60 above the granular purifying agent 50. Additionally, the first layer of filtration material 51 may or may not help to support the water flow directing ring 60.

In order to re-direct a portion of the water that would otherwise flow down the interior surface 46a of the cover member 36 into the peripherally disposed region 50a of the granular purifying agent adjacent the interior surface 46b of the vessel member 30, at least one drip arm extends radially inwardly from the main body portion 62 of the water flow directing ring 60 in overlying relation to the granular purifying agent 50. To maximize the flow throughput of the water being filtered, and to resist the formation of air pockets within the granular purifying agent 50, the at least one drip arm comprises a plurality of drip arms 64, and in the preferred embodiment, as illustrated, there are six drip arms 64. Further, to distribute the water evenly over the central area 50b of the granular purifying agent 50, a number of the plurality of drip arms 64 are each of a different length than some other drip arms 64. More specifically stated, a number of the plurality of drip arms 64 are each of a short length and a number of the plurality of drip arms 64 are each of a long length. In the preferred embodiment, as illustrated, there are three short length drip arms 64s and three long length drip arms 64l. Such a configuration promotes substantially even distribution of water into and through the first layer of filtration material 51, the granular purifying agent 50, and the second layer of filtration material 52.

As can be best seen in FIGS. 2 and 3, the water directing ring 60 may additionally act as a retaining ring for the first layer of filtration material 51.

In the preferred embodiment as illustrated, the main body portion 62 is of substantially circular outline, and is substantially planar for ease of manufacture and for reasons of close frictional fitment into the cover member 36. Also, the drip arms 64 extend radially inwardly from the main body portion 62 substantially in the same plane, thus making the entire water flow directing ring 60 substantially planar. Preferably, the drip arms 64 are integrally formed with the substantially peripherally disposed main body portion 62 for reasons of cost reduction and ease of manufacture.

The water flow directing ring 60 further preferably comprises a plurality of peripheral tabs 66 projecting radially outwardly from the main body portion 62 to effect the aforesaid contact of the main body portion 62 of the water flow directing ring 60 with the interior surface 46a of the cover member 36. The peripheral tabs 66 are slightly deformable in order to permit the water flow directing ring 60 to adapt to minor variations (tolerances) in the shape and size of the interior surface 46a of the cover member 36. The water flow directing ring 60 further preferably comprises a plurality of venting indentations 68 disposed in radially inwardly projecting relation in the outer periphery 63 of the main body portion 62, which venting indentations 68 facilitate upwardly directed venting of air through the granular purifying agent so as water is downwardly flowing through the filter cartridge 20 into the collection beaker 28. This serves, to assist in preventing the formation of air pockets within the granular purifying agent 50.

Figure 6:
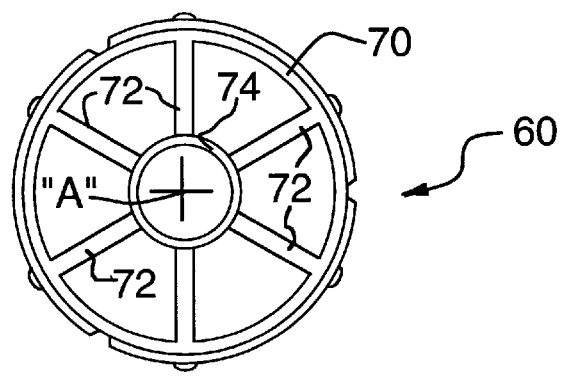
FIG. 6 is a top plan view of an alternative embodiment of the key component shown in FIGS. 4 and 5.

In an alternative embodiment, as is illustrated in FIG. 6, there is shown a water flow directing ring 70 having a plurality of drip arms 72. The drip arms 72 terminate in a common ring member 74, which common ring member 74 is generally centered about the vertical axis "A" of the substantially frustoconical vessel member (not shown). The water flow directing ring 70 is in all other material respects substantially the same as the water flow directing ring 60 of the first embodiment, so that analogous reference numerals have been used for the remaining structures of analogous function not specifically mentioned in this paragraph. The water flow distribution ring 70 is essentially interchangeable with the water flow directing ring 60 of the first embodiment.

Other variations of the above principles will be apparent to those who are knowledgeable in the field of the invention, and such variations are considered to be within the scope of the present invention. Further, other modifications and alterations may be used in the design and manufacture of the apparatus of the present invention without departing from the spirit and scope of the accompanying claims.

We claim:

1. In a water filter cartridge of the type having a substantially frustoconical vessel member defining a vertical axis and containing a granular purifying agent which is insoluble in water, said vessel member having a screen-like end wall portion at a lower end thereof, a hollow substantially frustoconical cover member attached to said vessel member and coaxial with the vertical axis thereof, said cover member defining an annular rim portion and a first slanted portion extending upwardly and inwardly from said rim portion, and a substantially flat-topped second portion, said first portion having a multiplicity of vertically oriented water entry flow slots arrayed therearound, said vessel member and said cover member together defining a container for receiving and retaining said granular purifying agent therein, said water filter cartridge for use in a water filtration device, wherein the improvement comprises:

a first layer of filtration material disposed within said vessel member and layered upon said granular purifying agent; and a water flow directing ring positioned within said container above said granular purifying agent and above said first layer of filtration material, said water flow directing ring having a substantially peripherally disposed main body portion shaped and dimensioned to contact said container at its interior surface above said granular purifying agent and above said first layer of filtration material and below said water entry flow slots, and at least one drip am extending radially inwardly from said main body portion in overlying relation to said granular purifying agent and said first layer of filtration material.

2. The improvement of claim 1, wherein said at least one drip arm extends radially inwardly and not upwardly from said main body portion in overlying relation to said granular purifying agent and said first layer of filtration material.

3. The improvement of claim 2, further comprising a second layer of filtration material disposed within said vessel member in juxtaposed relation to said end-wall portion, such that said granular purifying agent is layered upon said second layer of filtration material.

4. The improvement of claim 3, wherein said first and second layers of filtration material are each constructed from a multiplicity of fine flexible fibres of a substance which is insoluble in water.

5. The improvement of claim 1, wherein said substantially peripherally disposed main body portion of said water flow directing ring is shaped and dimensioned to contact said cover member at its interior surface.

6. The improvement of claim 1, wherein said at least one drip arm comprises a plurality of drip arms.

7. The improvement of claim 6, wherein a number of said plurality of drip arms are each of a different length than some other drip arms.

8. The improvement of claim 7, wherein a number of said plurality of drip arms are each of a short length and a number of said plurality of drip arms are each of a long length.

9. The improvement of claim 8, wherein said at least one drip arm comprises six drip arms.

10. The improvement of claim 9, wherein three of said plurality of drip arms are each of a short length and three of said plurality of drip arms are of a long length.

11. The improvement of claim 10, further comprising a plurality of peripheral tabs projecting radially outwardly from said main body portion to effect said contact of the main body portion of said water flow directing ring with the interior surface of said container.

12. The improvement of claim 11, further comprising a plurality of venting indentations disposed in radially inwardly projecting relation in the outer periphery of said main body portion.

13. The improvement of claim 12, wherein said main body portion is substantially planar.

14. The improvement of claim 13, wherein said water flow directing ring is substantially planar.

15. The improvement of claim 6, wherein said plurality of drip arms terminate in a common ring member.

16. The improvement of claim 15, wherein said common ring member is generally centered about said vertical axis of said substantially frustoconical vessel member.

* * * * *